United States Patent [19]
Mizutani et al.

[11] Patent Number: 5,806,374
[45] Date of Patent: Sep. 15, 1998

[54] OPERATION SWITCH DEVICE FOR USE WITH LAWNMOWER

[75] Inventors: Makoto Mizutani; Ariya Noda; Tadayoshi Tsuchiya, all of Anjo, Japan

[73] Assignee: Makita Corporation, Anjo, Japan

[21] Appl. No.: 823,306

[22] Filed: Mar. 21, 1997

[30] Foreign Application Priority Data

Mar. 22, 1996 [JP] Japan ................................ 8-066264

[51] Int. Cl.⁶ .............................. A01D 75/20; G05G 5/00
[52] U.S. Cl. ....................... 74/483 PB; 56/10.5; 56/11.3
[58] Field of Search ......................... 74/483 K, 483 PB, 74/483 R; 56/10.5, 10.8, 11.3

[56] References Cited

U.S. PATENT DOCUMENTS

| | | | |
|---|---|---|---|
| 4,413,466 | 11/1983 | Beugelsdyk et al. | 56/11.3 |
| 4,428,180 | 1/1984 | Carlson | 56/11.3 |
| 5,203,147 | 4/1993 | Long | 56/10.1 |
| 5,606,851 | 3/1997 | Bruener et al. | 56/10.8 X |

FOREIGN PATENT DOCUMENTS

| | | |
|---|---|---|
| 0047416 | 3/1982 | European Pat. Off. . |
| 8108936 | 7/1981 | Germany . |
| 3926098 | 2/1991 | Germany . |
| 4119937 | 12/1991 | Germany . |
| 4303365 | 8/1994 | Germany . |
| 2139329 | 11/1984 | United Kingdom . |

*Primary Examiner*—Charles A. Marmor
*Assistant Examiner*—Troy Grabow
*Attorney, Agent, or Firm*—Dennison, Meserole, Pollack & Scheiner

[57] ABSTRACT

An operation switch device for use with a lawnmower includes a switch and a first operation member operably movable between an "ON" position and an "OFF" position. A second operation member is mounted on the first operation and is positionable in a first position where the switch is turned on and a second position where the switch is held off when the first operation member is in the "ON" position and the "OFF" position, respectively. A restraining member in a restraining position is operable to prevent the second operation member from moving from the second position to the first position. The restraining member in a releasing position is operable to permit the second operation member to move from the second position to the first position. A resilient member is provided for resiliently permitting the second operation member to move relative to the first operation member, so that the first operation member is movable from the "ON" position to the "OFF" position with the second operation member being prevented from moving from the second position to the first position by the restraining member when the restraining member is in the restraining position.

9 Claims, 9 Drawing Sheets

OPERATION SWITCH DEVICE FOR USE WITH LAWNMOWER

BACKGROUND OF THE INVENTION

1. Field of the Invention

The present invention relates to an operation switch device for use with a lawnmower, and particularly to an operation switch device called "lock-off type switch device" which requires to be operated by an operator in a double-action manner through both hands of the operator for driving the lawnmower.

2. Description of the Prior Art

Conventional operation switch devices of the type described above are disclosed in U.S. Pat. No. 5,203,147 and GB 2139329 A. With each of the operation switch devices, an operation lever biased toward an "OFF" position and a lock mechanism for fixing the operation lever in the "OFF" position are provided, so that the movement of the operation lever toward an "ON" position is permitted only when the lock mechanism has been released. Thus, in order to drive the lawnmower, an operator is required to use both hands for simultaneously performing operations for releasing the lock mechanism and for moving the operation lever from the "OFF" position to the "ON" position. This may reliably prevent the lawnmower from malfunction.

However, with the conventional operation switch devices, since the lock mechanism absolutely inhibits the movement of the operation lever from the "OFF" position to the "ON" position, the operation lever cannot be moved to the "ON" position unless the lock mechanism has been released. Therefore, when the operator moves the operation lever toward the "ON" position with the lock mechanism being insufficiently released, there is some possibility that the lock mechanism is damaged.

SUMMARY OF THE INVENTION

It is, accordingly, an object of the present invention to provide an operation switch device for use with a lawnmower which may not cause damage to a lock mechanism during the switching operation.

It is another object of the present invention to provide an operation switch device for use with a lawnmower which may not cause damage to a switch during the switching operation.

According to the present invention, there is provided an operation switch device for use with a lawnmower, comprising:

a switch;

a first operation member operably movable between an "ON" position and an "OFF" position;

a second operation member mounted on the first operation member and movable with the first operation member, the second operation member being positionable in a first position where the switch is turned on and a second position where the switch is held off when the first operation member is in the "ON" position and the "OFF" position, respectively;

a restraining member movable between a restraining position and a releasing position, the restraining member in the restraining position preventing the second operation member from moving from the second position to the first position, and the restraining member in the releasing position permitting the second operation member to move from the second position to the first position; and a resilient member for resiliently permitting the second operation member to move relative to the first operation member, so that the first operation member is movable from the "ON" position to the "OFF" position with the second operation member being prevented from moving from the second position to the first position by the restraining member when the restraining member is in the restraining position.

With this construction, when the first operation member is moved from the "OFF" position to the "ON" position with the restraining member positioned in the releasing position, the second operation member is moved from the second position to the first position, so that the switch is turned on. When the first operation member is moved from the "OFF" position to the "ON" position with the restraining member positioned in the restraining position, the second operation member is prevented by the restraining member from moving from the second position to the first position, so that the switch is held off.

Since the second operation member is permitted by the resilient member to move in the direction toward the second position, the first operation member can be moved from the "ON" position to the "OFF" position irrespective of the position of the restraining member.

For this reason, the switch may not be damaged even if the first operation member has been moved to the "ON" position when the restraining member is not sufficiently moved to the releasing position.

In addition, the first operation member can be moved further even after the second operation member has been brought to the first position to turn on the switch since the second operation member can be resiliently moved relative to the first operation member. This means that such a further movement of the first operation member can be absorbed by the movement of the second operation member relative to the first operation member. Therefore, in this respect, the switch can be reliably prevented from being damaged.

DETAILED DESCRIPTION OF THE PREFERRED EMBODIMENTS

Figure 4A:
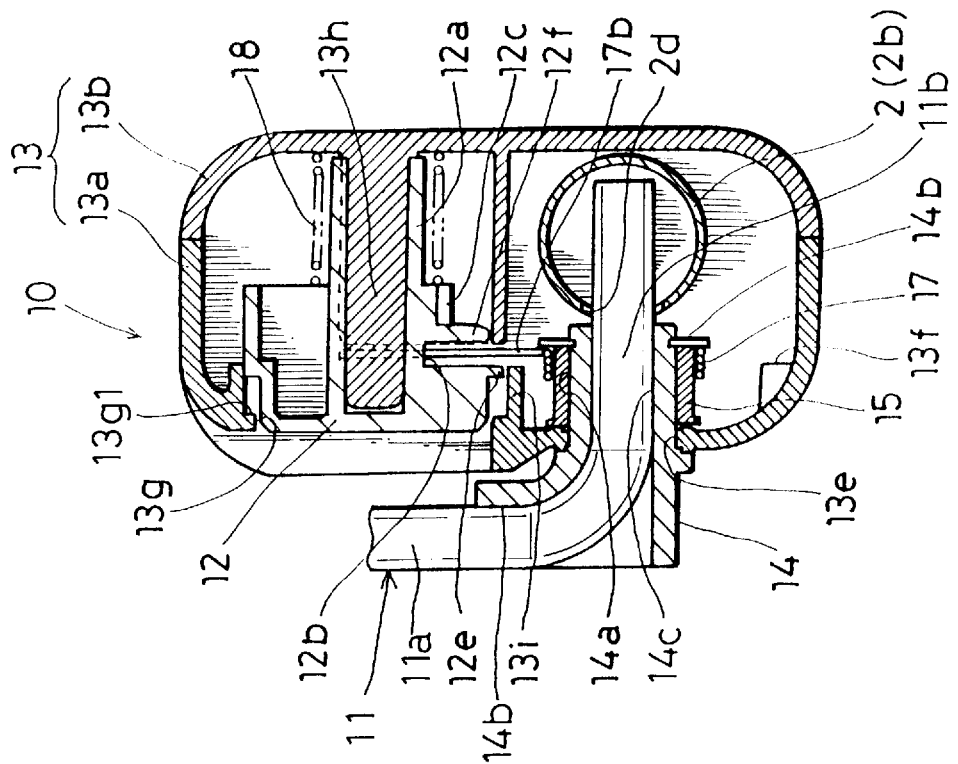
FIG. 4(A) is a sectional view of the device with the restraining member in the restraining position and with the first operation member in an "OFF" position.
Figure 4B:
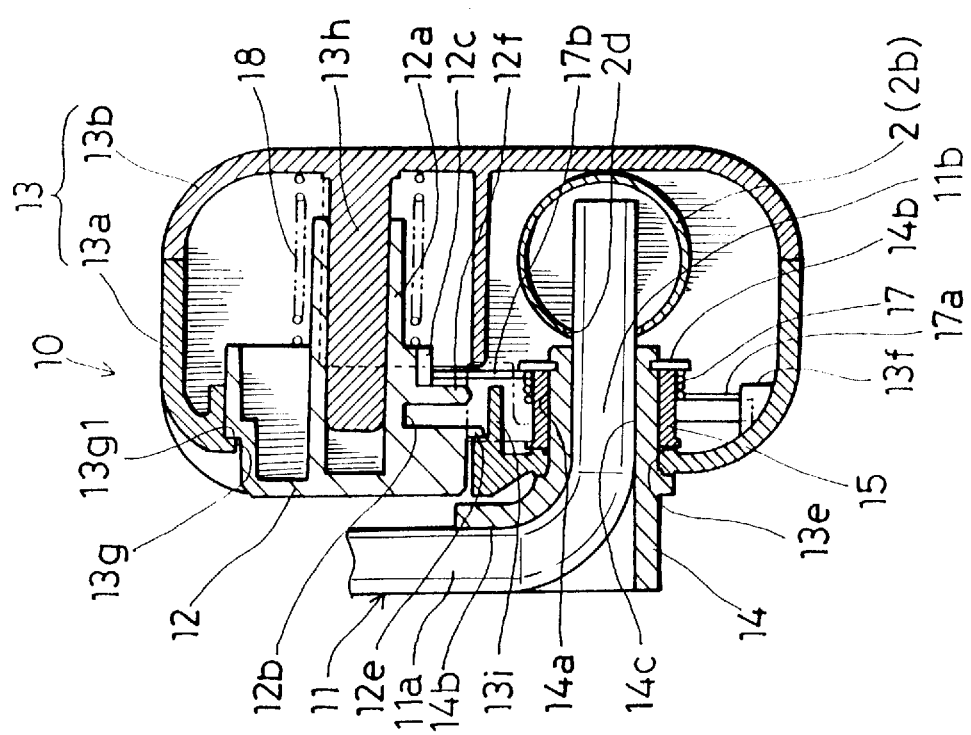
FIG. 4(B) is a view similar to FIG. 4(A) but showing the device with the restraining member in the releasing position and with a second operation member or one end of a torsion spring entering a recess of the restraining member.
Figure 5:
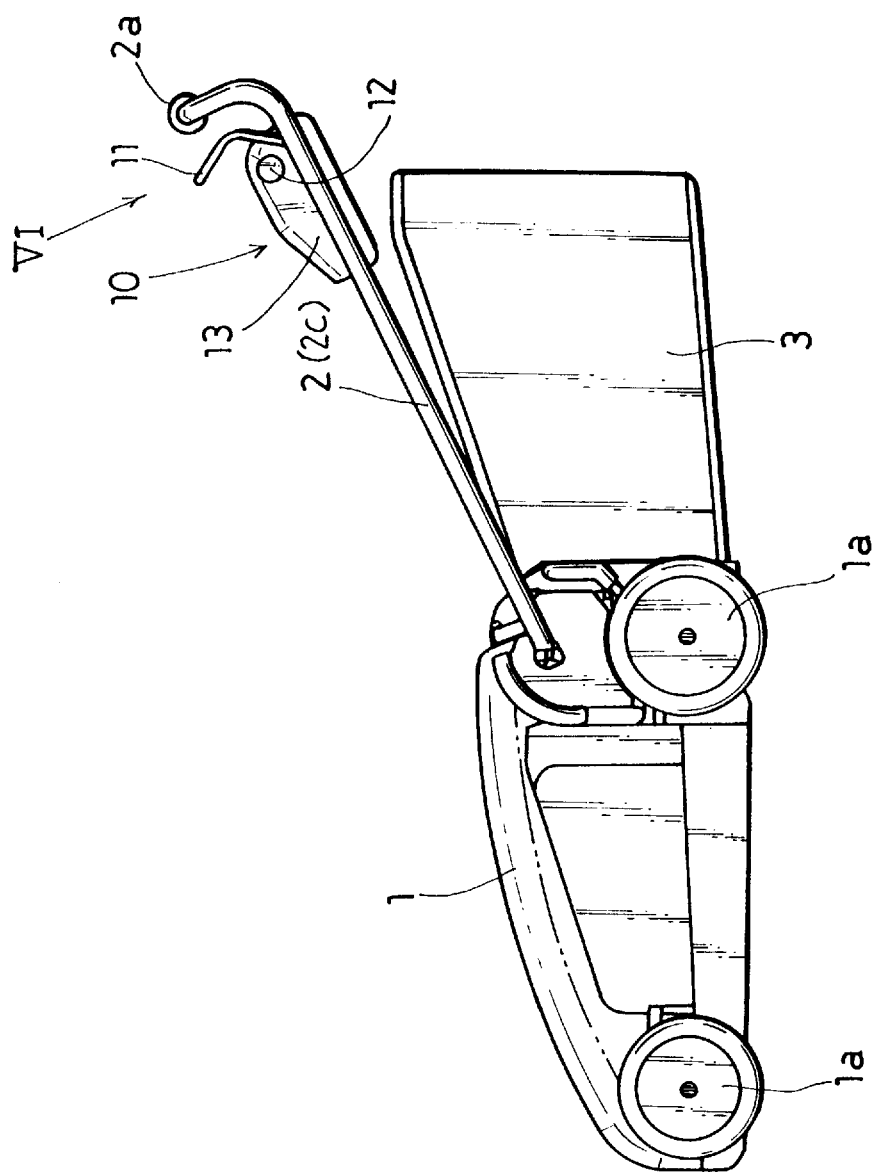
FIG. 5 is a side view of a lawnmower incorporating the operation switch device according to the first embodiment.

A first embodiment of the present invention will now be explained with reference to FIGS. 1 to 9. A lawnmower incorporating an operation switch device 10 of this embodiment is shown in FIG. 5. As shown therein, the lawnmower includes a body 1, wheels 1a and a box 3 for collecting lawns after they have been cut. These members are conventional in construction, and therefore, their description will not be given in detail.

An operation handle 2 extends from both sides of a part of the body 1 adjacent the rear end (right end as viewed in FIG. 5) of the body 1. The operation handle 2 has a substantially U-shaped configuration and includes a pair of legs 2b and 2c disposed on both sides of the body 1 and extending rearwardly from the body 1, so that the operation handle 2 is mounted on the body 1 to extend from both sides of the body 1. The handle 2 has a rear end portion on the side of an operator. The rear end portion extends between the legs 2b and 2c and is bent upwardly at substantially right angles relative thereto as shown in FIG. 5. The operation switch device 10 is mounted on the leg 2b in a position adjacent the rear end portion. The rear end portion of the handle 2 has a grip member 2a fitted thereon. The grip member 2a is made of rubber or the like, so that the operator can easily grasp the handle 2.

Figure 6:
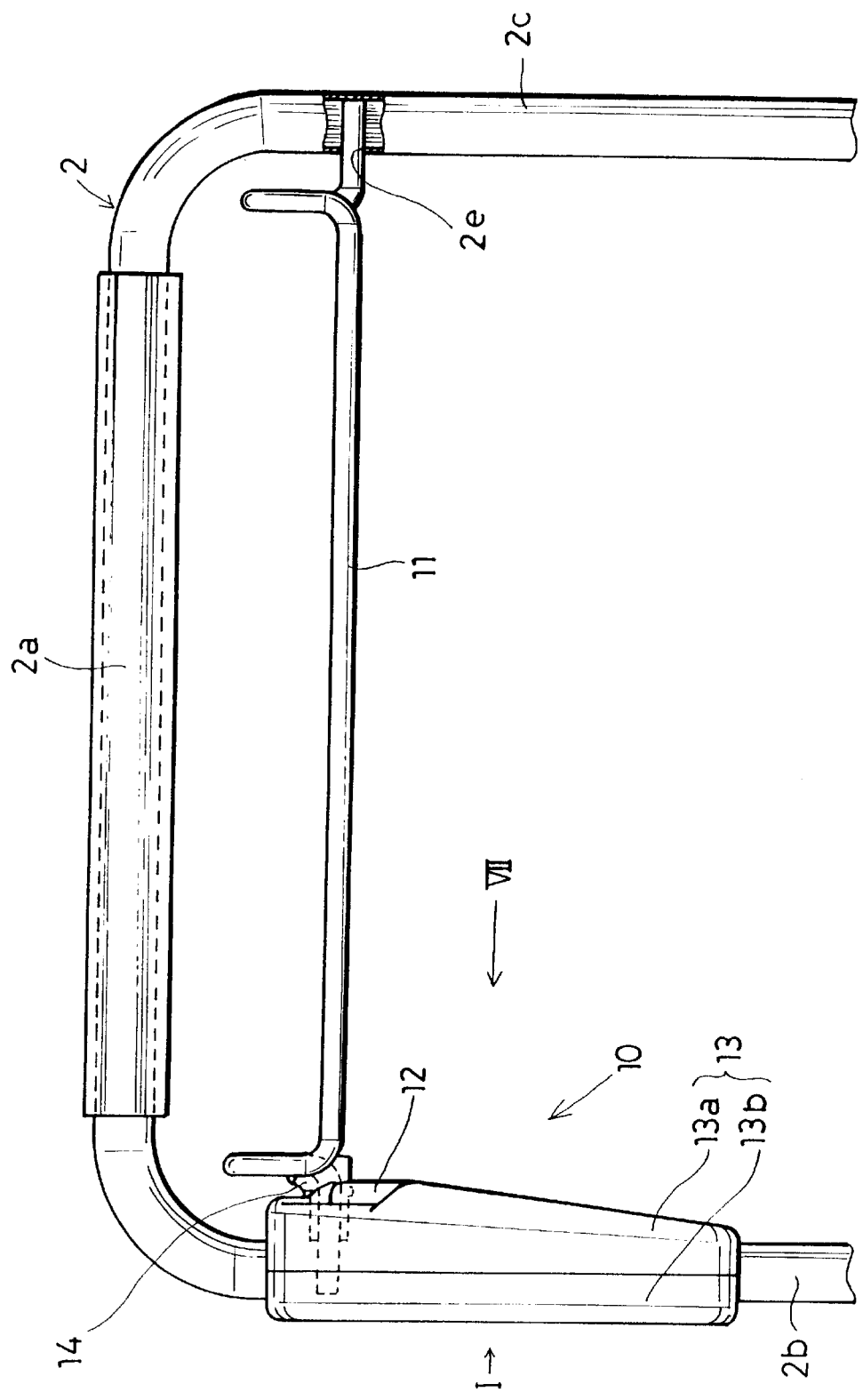
FIG. 6 is a plan view of the device as viewed in the direction of an arrow VI in FIG. 5.
Figure 7:
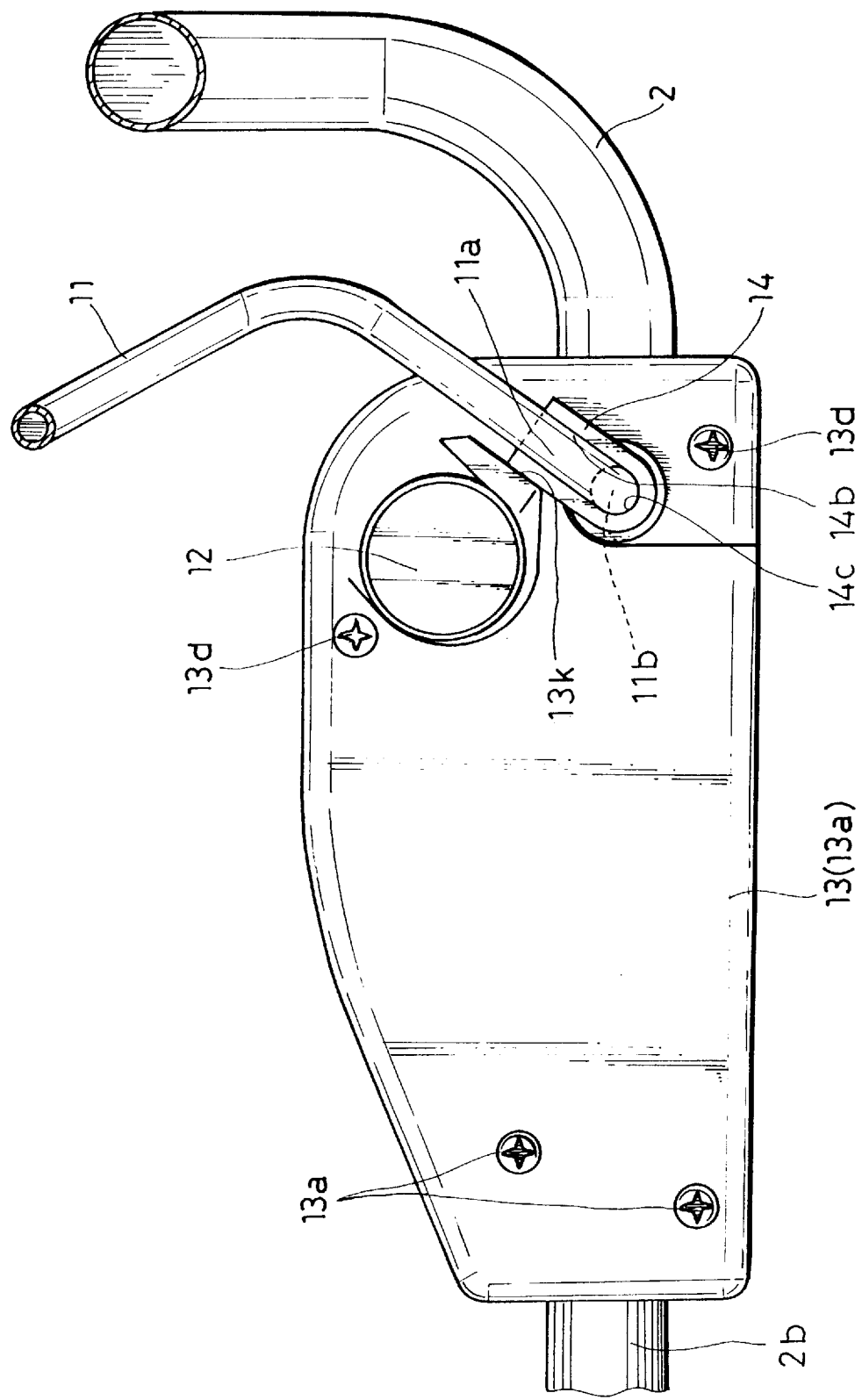
FIG. 7 is a side view of the device as viewed in the direction of an arrow VII in FIG. 6.
Figure 8D:
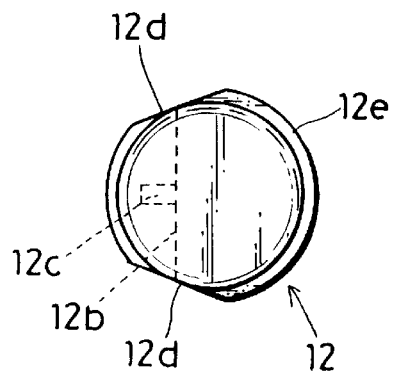
FIG. 8(D) and 8(E) are a plan view and a bottom view of the restraining member, respectively.
Figure 8A:
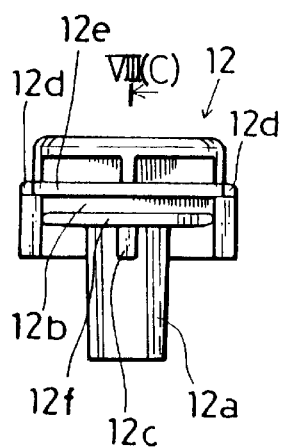
FIGS. 8(A) and 8(B) are a left side view and a front view of the restraining member, respectively.
Figure 8B:
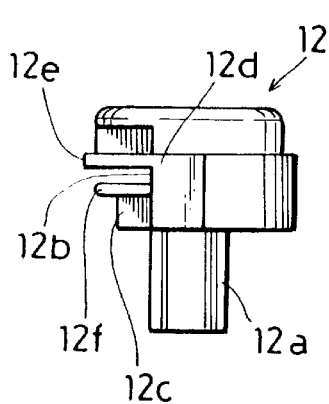
Figure 8C:
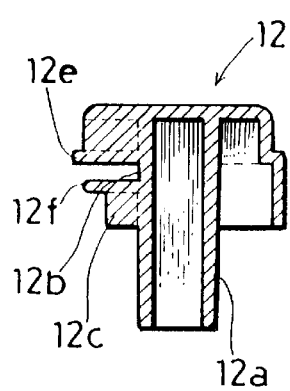
FIG. 8(C) is a sectional view taken along line VIII(C)—VIII(C) in FIG. 8(A)
Figure 8E:
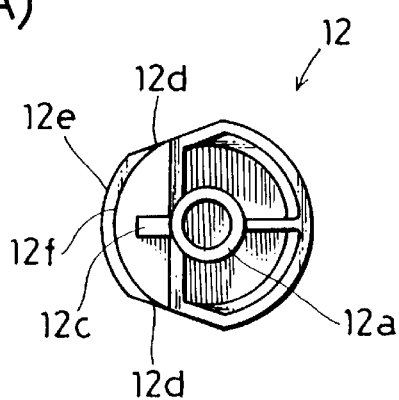

Referring to FIGS. 6 and 7, the operation switch device 10 includes a first operation member 11 and a restraining member 12. The first operation member 11 has a long length and is disposed along the inside of the rear end portion of the operation handle 2. The restraining member 12 takes the form of a push button adapted to be pushed by the operator at a position around the leg 2b of the operation handle 2. The leg 2b is positioned on the left side as viewed in FIG. 6. As shown in FIG. 6, the first operation member 11 extends between the legs 2a and 2b of the operation handle 2 and is pivotable relative to the legs 2a and 2b. As shown in FIG. 7, the first operation member 11 has bent portions positioned adjacent both end portions thereof and bent upwardly from the end portions at substantially right angles.

Each of the end portions of the first operation member 11 has a first end part 11a and a second end part 11b bent substantially at right angles relative to the first end part 11b.

One of the second end parts 11b of the first operation member 11 positioned on the left side as viewed in FIG. 6 extends into a casing 13 which is formed by casing halves 13a and 13b and which is mounted on the leg 2b of the operation handle 2. Within the casing 13, the second end part 11b is inserted into a support hole 2d formed in the leg 2b and extends in a diametrical direction of the leg 2b, so that the second end part 11b is rotatably supported by the leg 2b (see FIGS. 4(A) and 4(B)).

The other of the second end parts 11b positioned on the right side as viewed in FIG. 6 is inserted into a support hole 2e formed in the leg 2c and extends in a diametrical direction of the leg 2c, so that the second end part 11b is rotatably supported by the leg 2c.

Thus, the first operation member 11 has both ends directly rotatably supported by the legs 2b and 2c . Therefore, it is not necessary to provide separate support boxes on the legs 2b and 2c as required in the operation switch device of U.S. Pat. No. 5,203,147 discussed above, so that the mounting operation of the first operation member 11 can be easily performed and that the operation switch device 10 can be manufactured at lower costs.

In addition, one end of the first operation member 11 on the left side as viewed in FIG. 6 is rotatably supported by the casing 13 by means of a substantially L-shaped connecting member 14. As shown in FIGS. 4(A), 4(B) and 7, the connecting member 14 has a U-shaped recess 14b and a circular insertion hole 14c which is connected to the U-shaped recess 14b in a direction perpendicular thereto.

The connecting member 14 is adapted to receive the first end part 11a and the second end part 11b of one end of the first operation member 11, so that the first end part 11a is received within the U-shaped recess 14b and that the second end part 11b is slidably inserted into the circular insertion hole 14c. With this construction, the connecting member 14 is rotatable with the operation member 11 about the axis of the second end part 11b when the operation member 11 is pivoted by the operator.

With the above mounting construction of one end of the first operation member 11 on the connecting member 14, the second end part 11b of one end of the first operation member 11 can be easily removed from the connecting member 14 and from the support hole 2d of the operation handle 2 when the operator forces the first operation member 11 to be resiliently deformed inwardly (leftwardly as viewed in FIGS. 4(A) and 4(B)) at a part adjacent its one end. For this reason, the second end part 11b can be easily inserted into the connecting member 14 and further into the support hole 2d. This is also applied to the operation for removing the second end part 11b of the other end of the first operation member 11 from the support hole 2e of the leg 2c of the operation handle 2 and the operation for inserting the second end part 11b into the support hole 2e.

The casing 13 will now be explained with reference to FIG. 1 which shows the casing 13 as viewed in the direction of an arrow I in FIG. 6 with the casing half 13b on the outer side being removed. As will be seen from FIG. 1, the casing half 13a on the inner side is secured to the leg 2b of the operation handle 2 by means of screws 13c. On the other hand, the casing half 13b is secured to the casing half 13a by means of screws 13d (see FIG. 7) with the leg 2b being positioned between the casing halves 13a and 13b.

As shown in FIGS. 4(A) and 4(B), the connecting member 14 is rotatably received within a support hole 13e formed in the casing half 13a and has a part extending into the interior of the casing 13. This part of the connecting member 14 has a pair of flat surfaces 14a formed on the outer surface thereof. The flat surfaces are opposed to each other in a diametrical direction. An intermediate lever 15 has a boss portion 15a which is fitted on this part of the connecting member 14. The boss portion 15a has an axial hole having a configuration conforming to the configuration of the outer surface of the above part of the connecting member 14, so that the intermediate lever 15 is rotatable with the connecting member 14 and with the first operation member 11. A stopper ring 14b is mounted on the above part of the connecting member 14 so that the intermediate lever 15 is held in position in the axial direction (right and left directions as viewed in FIGS. 4(A) and 4(B)) between the stopper ring 14b and the casing half 14b.

Figure 1:
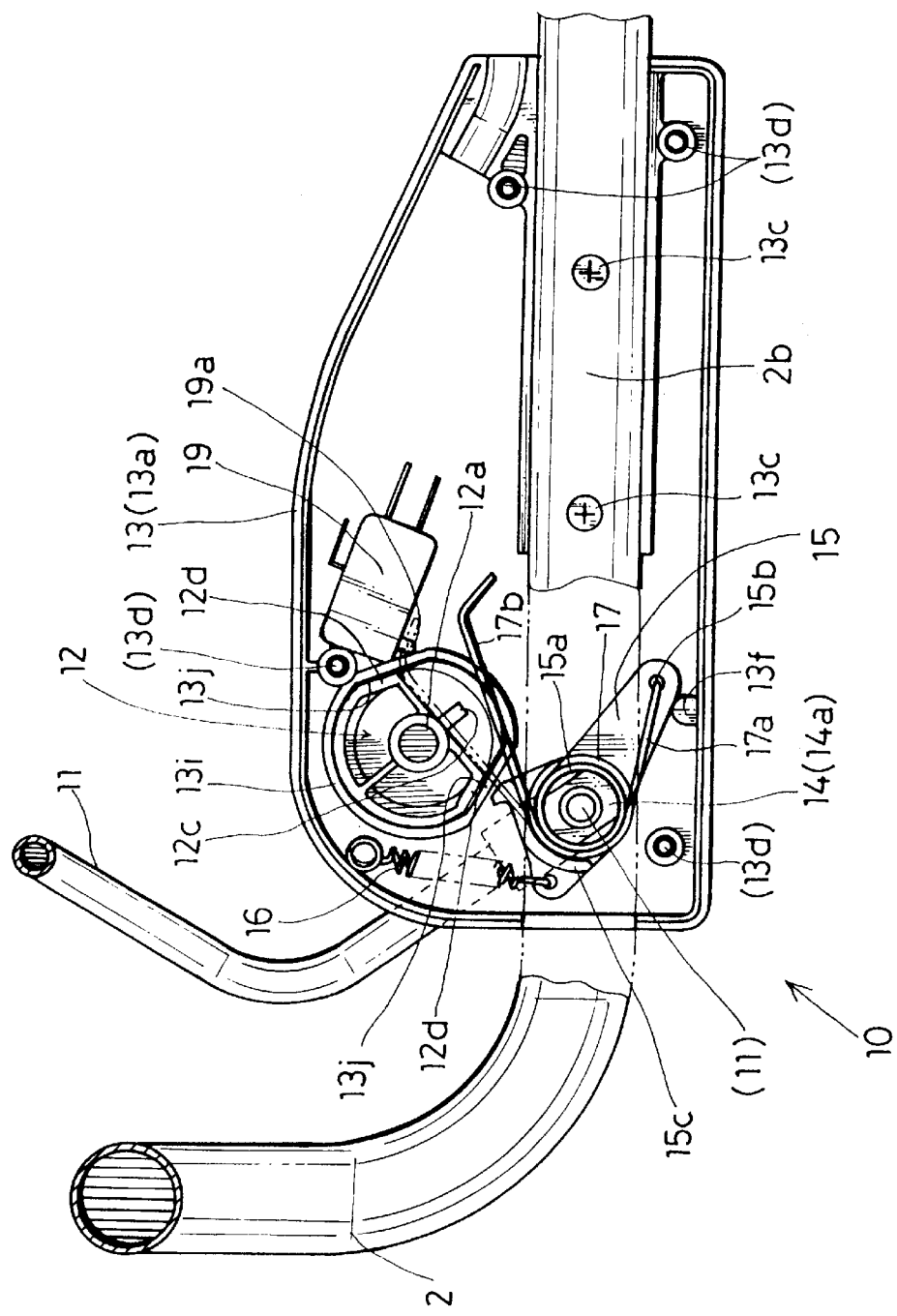
FIG. 1 is a side view, as viewed in the direction of an arrow I in FIG. 6, of an operation switch device according to a first embodiment of the present invention with one of casing halves removed.
Figure 2:
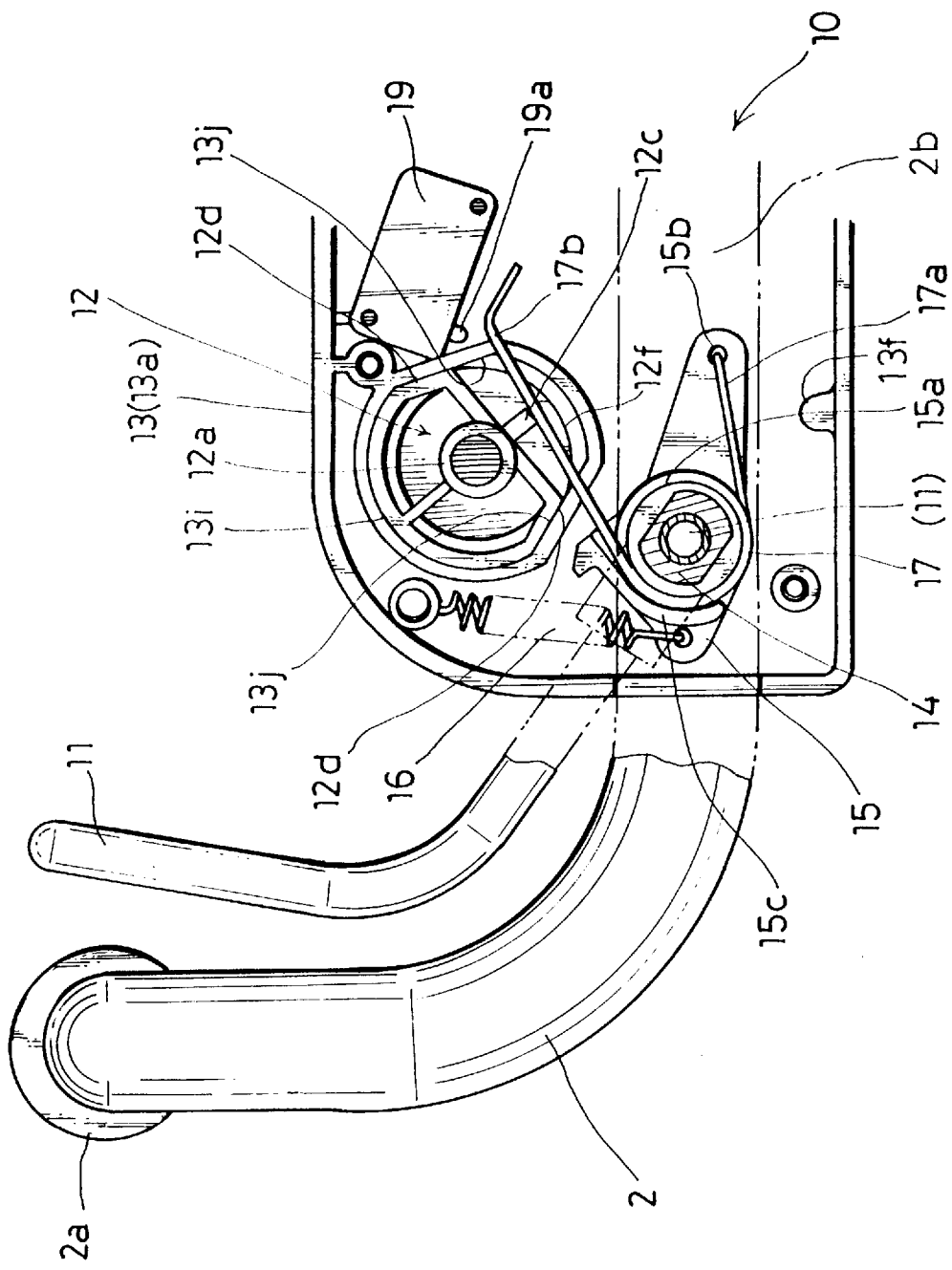
FIG. 2 is a view showing the operation of the device when a first operation member is pivoted to an "ON" position with a restraining member positioned in a restraining position.
Figure 3:
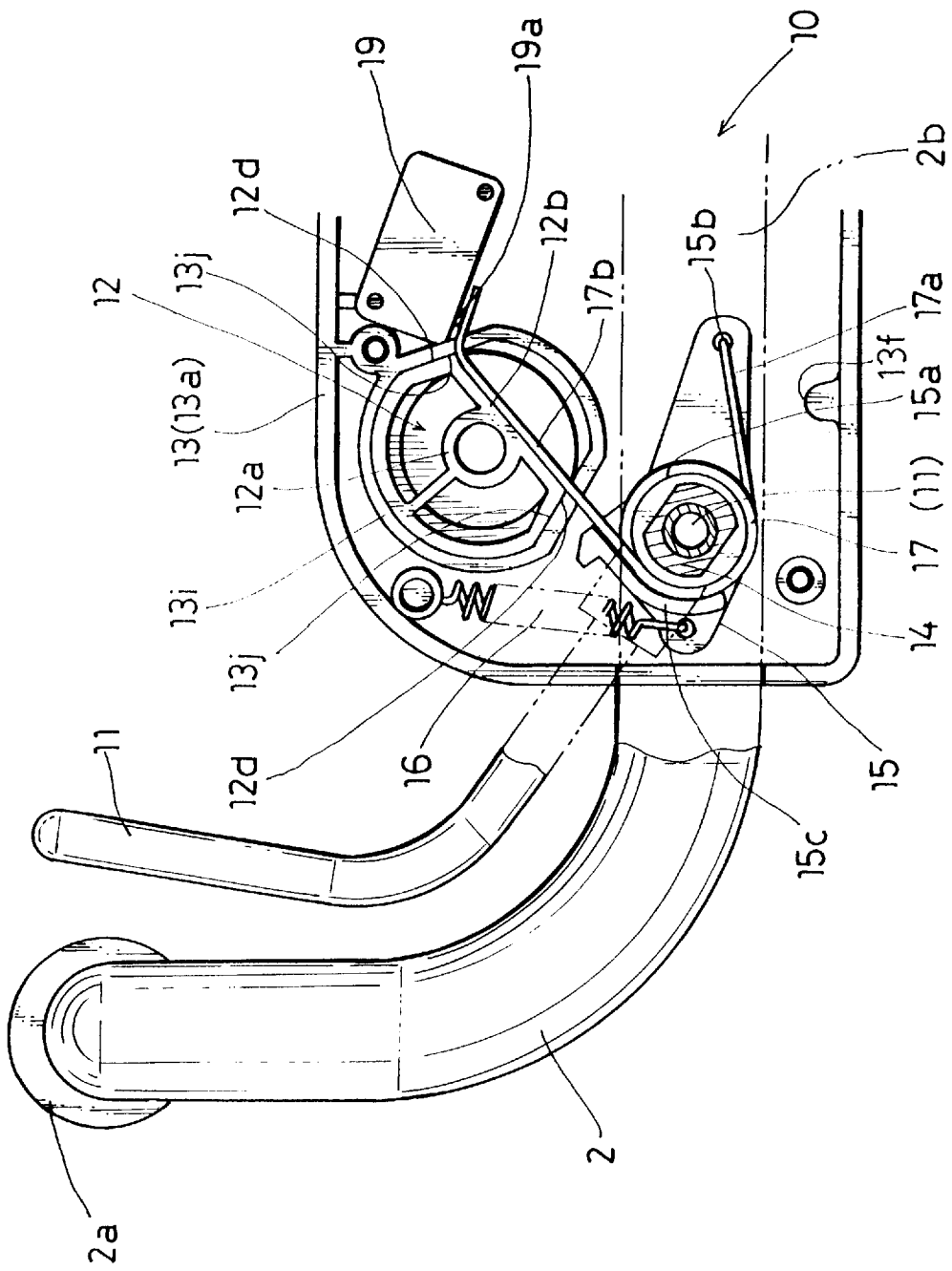
FIG. 3 is a view similar to FIG. 2 but showing the operation when the first operation member is pivoted to the "ON" position with the restraining member positioned in a releasing position.

As shown in FIGS. 1 to 3, a tension spring 16 is connected between the left end of the intermediate lever 15 and the casing half 13a, so that the first operation member 11 as well as the intermediate lever 15 is biased in a clockwise direction in FIGS. 1 to 3 or the direction in which the first operation member 11 is moved away from the rear end of the operation handle 2. Here, the first operation member 11 is movable between an "OFF" position and an "ON" position. The first operation member 11 in the "OFF" position is positioned away from the operation handle 2 as shown in FIG. 1, and the first operation member 11 in the "ON" position is positioned adjacent the rear end of the operation handle 2 as shown in FIGS. 2 and 3. The first operation member 11 is normally held in the "OFF" position and is moved from the "OFF" position to the "ON" position when the operator pivots the first operation member 11 against the biasing force of the tension spring 16.

The limit of rotation of the intermediate lever 15 in the clockwise direction or the "OFF" position of the first operation member 11 is defined by a stopper protrusion 13f formed on the casing half 13a as shown in FIG. 1. In addition, the "OFF" position of the first operation member 11 is defined by a stopper portion 13k formed on an outer surface of the casing half 13a (see FIG. 7), so that the connecting member 14 abuts on the stopper portion 13k when the first operation member 11 is in the "OFF" position.

A torsion coil spring 17 has a coiled part slidably fitted on the boss portion 15a of the intermediate lever 15. The torsion coil spring 17 has a first end portion 17a which is engaged with a hole 15b formed in the right side end of the intermediate lever 15 (see FIGS. 1 to 3). A stopper edge 15c having an arcuate configuration is formed on the intermediate lever 15 and extends along the outer surface of the boss portion 15a in spaced relationship therewith. The stopper edge 15c is positioned on the left side of the boss portion 15a or the side opposite to the hole 15b, so that a second end portion 17b of the torsion coil spring 17 extends along the stopper edge 15c so as to protrude from the boss portion 15a to a position laterally confronting the restraining member 12. The second end portion 17b serves as a second operation member for operating a microswitch 19 as will be explained later. The second end portion 17b is prevented by the stopper edge 15c from moving in the counterclockwise direction as viewed in FIGS. 1 to 3 but is permitted to move in the clockwise direction against the biasing force produced by the coiled part.

As will be best seen from FIG. 6, the restraining member 12 is mounted on the casing half 13a on the side inwardly thereof or on the side inwardly of the operation handle 2. With this arrangement, the restraining member 12 is reliably prevented from being accidentally operated.

As shown in FIGS. 4(A) and 4(B), the casing half 13a has an insertion hole 13g for receiving the restraining member 12. The restraining member 12 has a boss portion 12a formed on the inner side thereof. The boss portion 12a is slidably fitted on a support protrusion 13h formed on the casing half 13b, so that the restraining member 12 is slidably movable relative to the casing 13. A compression spring 18 is interposed between the restraining member 12 and the casing half 13b, so that the restraining member 12 is normally biased in a direction to protrude outwardly from the insertion hole 13g. The insertion hole 13g has a stepped portion 13g to limit the position of the restraining member 12 in the protruding direction as shown in FIG. 4(A). This position is hereinafter called "restraining position". When the operator pushes the restraining member 12 into the casing 13 against the biasing force of the compression spring 18, the movement of the restraining member 12 is stopped through abutment of the boss portion 12a on the casing half 13b. This position is hereinafter called "releasing position". Since FIGS. 1 to 3 show the casing 13 with the casing half 13b removed, the support protrusion 13h is not shown in these figures and the restraining member 12 is shown as a view from the inner side of the casing 13.

FIGS. 8(A) to 8(E) show the restraining member 12 in various views. A recess 12b is formed in a lateral surface of the restraining member 12 within a predetermined range in the circumferential direction thereof, so that the recess 12b has the depth in the radial direction of the restraining member 12. A protruding edge 12c is also formed on the lateral surface of the restraining member 12 and is positioned below the recess 12b. The recess 12b has a flat bottom surface which is positioned inwardly of an end surface of the protruding edge 12c. A partition wall 12f is formed between the recess 12b and the protruding edge 12c and extends outwardly beyond the protruding edge 12c, so that the second operation member or the second end portion 17b of the torsion coil spring 17 may not be moved into the recess 12b when the restraining member 12 is pushed into the casing 13 or is moved from the restraining position toward the releasing position.

The restraining member 12 is mounted on the casing half 13a with its position held in the rotational direction such that the recess 12b and the protruding edge 12c are oriented toward the second end portion 17b of the torsion coil spring 17. To this end, the restraining member 12 includes a pair of flat surfaces 12d formed on its lateral surface and positioned on both sides in the circumferential direction of a flange portion 12e which extends outwardly beyond the partition walls 12f to some extent. On the other hand, the casing half 13a has a boss portion 13i formed on its inner side for receiving the restraining member 12. The boss portion 13i includes a pair of flat surfaces 13j formed on its inner peripheral surface and spaced from each other in the circumferential direction by a distance equal to the distance between the flat surfaces 12d of the restraining member 12. The restraining member 12 is inserted into the boss portion 13i with the flat surfaces 12d facing the flat surfaces 13j, so that the restraining member 12 is prevented from rotation relative to the boss portion 13i.

With this construction, when the restraining member 12 is in the restraining position shown in FIG. 4(A), the protruding edge 12c confronts the second operation member or the second end portion 17b of the torsion coil spring 17. On the other hand, when the restraining member 12 is in the releasing position shown in FIG. 4(B), the recess 12b confronts the second operation member 17b.

As shown in FIGS. 1 to 3, the microswitch 19 is mounted on the casing half 13a and is positioned on the left side as viewed in these figures. The microswitch 19 has a button 19a which is adapted to be pushed by the second operation member or the second end portion 17b of the torsion coil spring 17. When the button 19a is pushed by the second end portion 17b, the microswitch 19 is turned on, so that a motor (not shown) accommodated within the body 1 is started for the cutting operation. The motor is connected to the microswitch 19 via an electrical circuit (not shown). The microswitch 19, the motor and the electrical circuit are conventional ones, and therefore, their description will not be given in detail.

The operation of the operation switch device 10 will now be explained. When both the first operation member 11 and the restraining member 12 are not operated by the operator, the first operation member 11 is held in the "OFF" position by the biasing force of the tension spring 16 in the clockwise direction as viewed in FIG. 1, and the restraining member 12 is held in the restraining position by the compression spring 18 as shown in FIG. 4(A). In this state, the second operation member or the second end portion 17b of the torsion coil spring 17 does not contact the bottom surface of the recess 12b nor the protruding edge 12c of the restraining member 12, so that the microswitch 19 is held in an "OFF" state.

As shown in FIG. 2, the first operation member 11 can be pivoted to the "ON" position with the restraining member 12 held in the restraining position. Thus, when the first operation member 11 is pivoted toward the "OFF" position, the intermediate lever 15 is rotated in the counterclockwise direction against the biasing force of the compression spring 16, resulting in that the second end portion 17b is moved toward the restraining member 12. However, in this state, since the restraining member 12 is in the restraining position, the second end portion 17b confronts the protruding edge 12c, so that the second end portion 17b is prevented from moving further in the counterclockwise direction after the second end portion 17b has been brought to abut on the protruding edge 12c. Therefore, the second end portion 17b may not reach a position to push the button 19a of the microswitch 19, and the motor of the lawnmower cannot be started. The first operation member 11 can be further pivoted after abutment of the second end portion 17b on the protruding edge 12c through the resilient deformation of the torsion coil spring 17. Thus, a further pivotal movement of the first operation member 11 after abutment of the second end portion 17b on the protruding edge 12c can be absorbed by the resilient deformation of the torsion coil spring 17 or the movement of the second end portion 17b in a direction away from the stopper edge 15c. The second end portion 17b is therefore held in position not to push the button 19b of the microswitch 19 during such a further pivotal movement of the first operation member 11.

In order to start the motor, the operator pushes the restraining member 12 to move it from the restraining position to the releasing position, and then he pivots the first operation member 11 from the "OFF" position to the "ON" position. When the restraining member 12 is in the releasing position, the second operation member or the second end portion 17b of the torsion spring 17 confronts the recess 12b of the restraining member 12. Therefore, when the first operation member 11 is pivoted from the "OFF" position to the "ON" position, the second end portion 17b may not abut on the protruding edge 12c but enters the recess 12b, so that the second end portion 17b can be moved beyond the position for abutment on the protruding edge 12c to the position where the second end portion 17b pushes the button 19a of the microswitch 19 to start the motor as shown in FIG. 3.

The second end portion 17b abuts on the bottom surface of the recess 12b of the restraining member 12 immediately after the push button 19a of the microswitch 19 has been pushed by the second end portion 17b. However, for the same reason as described in connection with the restraining position of the restraining member 12, the first operation member 11 can be further pivoted after abutment of the second end portion 17b on the bottom surface of the recess 12b through the resilient deformation of the torsion coil spring 17. Thus, the second end portion 17b is held in position to push the button 19b of the microswitch 19 by an appropriate force during such a further pivotal movement of the first operation member 11. Therefore, the microswitch 19 can be reliably prevented from being damaged.

After the motor has been started, the microswitch 19 is held to be pushed by the second end portion 17b even if the operator releases the restraining member 12. Thus, the restraining member 12 is held in the releasing position against the biasing force of the compression spring 18 since the second end portion 17b is in engagement with the recess 12b. However, in order to keep the motor in a driving condition, the operator still is required to hold the first operation member 11 in the "ON" position.

When the operator releases the first operation member 11, the intermediate lever 15 is pivoted in the clockwise direction by the biasing force of the tension spring 16, so that the first operation member 11 returns to the "OFF" position and that the second end portion 17b of the torsion spring 17 is moved in the clockwise direction away from the button 19a of the microswitch 19. The microswitch 19 is therefore turned off to stop the motor.

As described above, with the operation switch device 10 of this embodiment, the first operation member 11 can be pivoted to the "ON" position even if the restraining member 12 has not been moved to the releasing position. Therefore, the microswitch 19 or any other parts of the operation switch device 10 may not be damaged even if an external force other than the operational force has been applied to the first operation member 11 or even if the first operation member 11 is compulsorily pivoted toward the "ON" position when the restraining member is in the restraining position. In particular, even if the first operation member 11 has been pivoted toward the "ON" position when the restraining member 12 is insufficiently released, the damage to the microswitch 19 as with the conventional operation switch device may not be caused. Thus, although the operation switch device 10 of this embodiment is a device called "lock-off switch device", the operation switch device 10 is advantageous in that the first operation lever 11 can be pivoted irrespective of the position of the restraining member 12.

In addition, since the first operation member 11 can be pivoted to the "ON" position even after the second end portion 17b of the torsion coil spring 17 abuts on the bottom surface of the recess 12b for turning on the microswitch 19, the degree of freedom of ON/OFF timing of the microswitch 19 with respect to the amount of operation of the first operation member 11 may be increased, so that the ON/OFF timing can be easily determined. In contrast, with the conventional operation switch device, a microswitch is turned on directly by one end of an operation lever corresponding to the first operation member 11 of this embodiment. Therefore, when the amount of operation of the operation lever is too large, there will be some possibility that the microswitch is damaged. For this reason, the conventional device requires to accurately determine the ON/OFF timing of the microswitch with respect to the amount of operation of the operation lever, and it is necessary to suitably determine the size and the moving amount of each of parts of the device including the operation lever.

In addition, this type of operation switch device is generally constructed such that a switch is turned on when an operation lever (corresponding to the first operation member 11) is operated after a lock releasing button (corresponding to the restraining member 11) has been moved to a releasing position. However, with the conventional operation switch device, there will be some possibility that the operation lever or the lock releasing button will be damaged when such an operation for turning on the switch is performed in the reversed order. With the operation switch device 10 of this embodiment, the first operation member 11 is permitted to be moved from the "OFF" position to the "ON" position with the restraining member 12 held in the restraining position, so that the parts of the operation switch device 10 may not be damaged. In addition, when the restraining member 12 is moved from the restraining position to the releasing position after the first operation member 11 has been moved from the "OFF" position to the "ON" position, the second operation member or the second end portion 17b of the torsion coil spring 17 which is in abutment on the protruding edge 12c may not be moved into the recess 12b of the restraining member 12 because of the existence of the partition wall 12f between the recess 12b and the protruding edge 12c. Therefore, the second end portion 17b may not turn on the microswitch 19, so that the motor can be reliably prevented from being started. Here, when the restraining member 12 is moved toward the releasing position, the second end portion 17b in abutment on the protruding edge 12c may be pushed by the partition wall 12f in the moving direction of the restraining member 12. However, the second end portion 17b which is a part of the torsion coil spring 17 can be resiliently deformed not to suffer any damage by the partition wall 12f.

Further, with this embodiment, the end portions of the first operation member 11 are inserted into the legs 2b and 2c of the operation handle 2, respectively, so that the first operation member 11 is pivotally supported by the operation handle 2. Therefore, it is not necessary to provide support boxes on the legs 2b and 2c as required in the conventional operation switch device. For this reason, the operation switch device 10 of this embodiment can be easily assembled and can be manufactured at lower costs.

Furthermore, since one end of the first operation member 11 is supported by the casing 13 by means of the connecting member 14, this end can be easily removed from and inserted into the casing 13 as well as the leg 2b of the operation handle 2. The other end of the first operation member 11 can also be easily removed from and inserted into the leg 2c through resilient deformation. Thus, the operation for removing and mounting the first operation member 11 can be easily performed, so that the operation switch device 10 is improved in its operability in assembling and handling the device.

Figure 9:
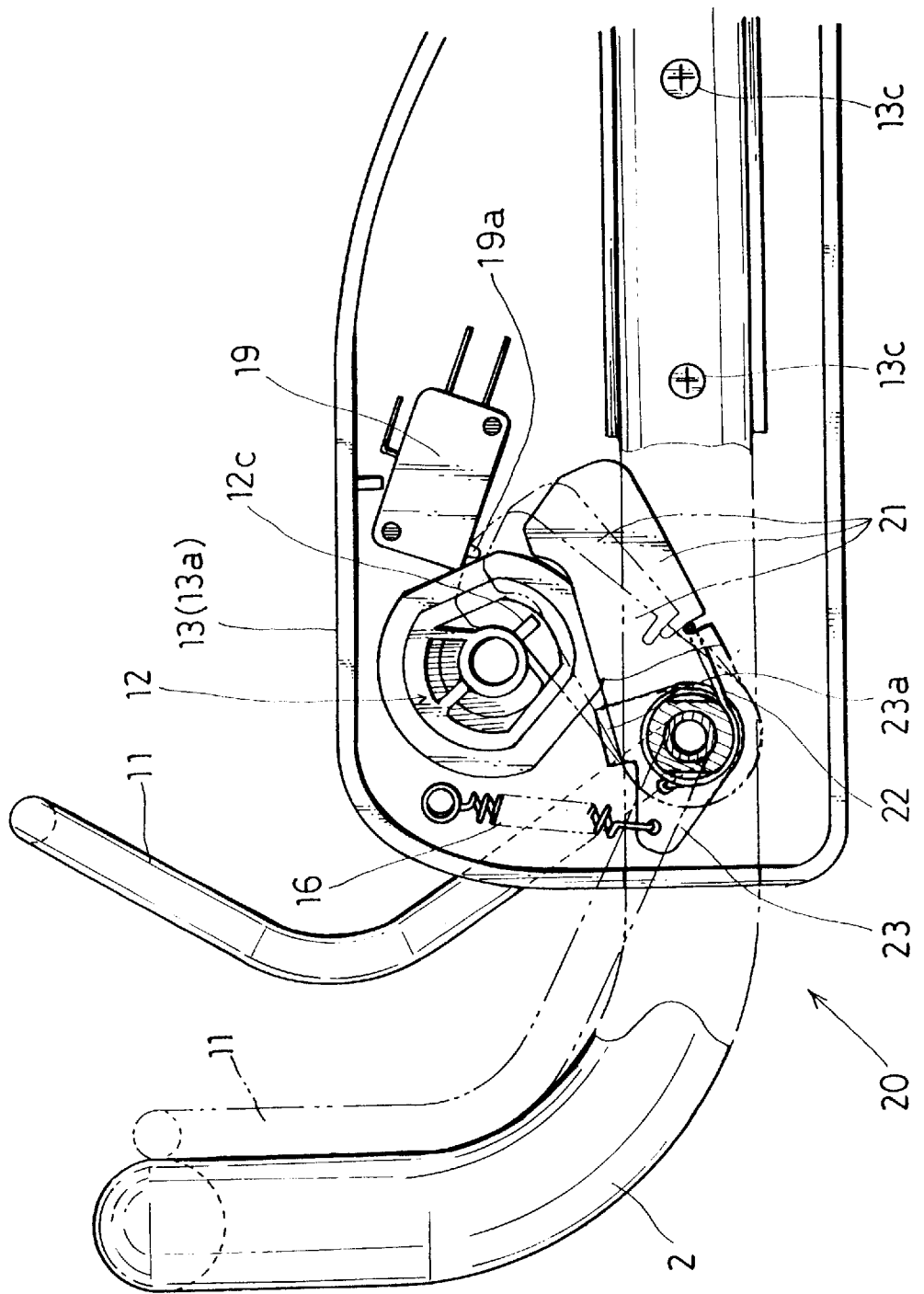
FIG. 9 is a side view, with one of casing halves removed, of an operation switch device according to a second embodiment of the present invention.

FIG. 9 shows a second embodiment of the present invention. This embodiment is a modification of the first embodiment. Therefore, like members are given the same reference numerals and their description will not be repeated.

An operation switch device 20 of this embodiment does not incorporate the second end portion 17b of the torsion coil spring 17 as the second operation member of the above embodiment but incorporates a rigid plate-like member 21 as a second operation member. The plate-like member 21 is rotatably mounted on an intermediate lever 23 which is rotatable with the connecting member 14 (not shown in FIG. 9). A torsion coil spring 22 is interposed between the plate-like member 21 and the intermediate lever 23, so that the plate-like member 21 is biased in a counterclockwise direction (direction to turn on the microswitch 19). A stopper edge 23a is formed on the intermediate lever 23 for defining a limit of rotation of the plate-like member 21 in the counterclockwise direction, so that the plate-like member 21 is normally held in abutment on the stopper edge 23a by the biasing force of the torsion coil spring 22. When the first operation member 11 is further pivoted after the second operation member or the plate-like member 21 has been brought to abut on the bottom of the recess 12b of the restraining member 12, the plate-like member 21 is pivoted relative to the intermediate member 23 to move away from the stopper edge 23a against the biasing force of the torsion coil spring 22, so that such a further pivotal movement of the first operation member 11 can be absorbed. In other respects, the second embodiment is substantially the same as the first embodiment.

Thus, also with this embodiment, the second operation member or the plate-like member 21 can be moved relative to the first operation member 11 in a direction away from the position which is the position to turn on the microswitch 19, so that the first operation member 11 can be pivoted to the "ON" position with the restraining member 12 positioned in the restraining position. Therefore, the microswitch 19 or any other parts of the operation switch device 20 may not be damaged even if the first operation member 11 has been operated with the restraining member 12 being not in the released position or with the restraining member 12 insufficiently released. In addition, the microswitch 19 may not be damaged when the first operation member 11 has been further pivoted after the microswitch 19 has been turned on by the plate-like member 21.

Further, the partition wall 12f is formed between the recess 12b and the protruding edge 12c of the restraining member 12 as in the first embodiment. Therefore, after the first operation member 11 has been moved to the "ON" position, the restraining member 12 cannot be moved from the restraining position to the releasing position through abutment of the partition wall 12f on the second operation member or the plate-like member 21.

While the invention has been described with reference to preferred embodiments thereof, it is to be understood that modifications or variations may be easily made without departing from the spirit of this invention which is defined by the appended claims.

What is claimed is:

1. An operation switch device for use with a lawnmower, comprising:

a switch;

a first operation member operably movable between an "ON" position and an "OFF" position;

a second operation member mounted on said first operation member and movable with said first operation member, said second operation member being positionable in a first position where said switch is turned on and a second position where said switch is held off when said first operation member is in said "ON" position and said "OFF" position, respectively;

a restraining member movable between a restraining position and a releasing position, said restraining member in said restraining position preventing said second operation member from moving from said second position to said first position, and said restraining member in said releasing position permitting said second operation member to move from said second position to said first position; and resilient means for resiliently permitting said second operation member to move relative to said first operation member, so that said first operation member is movable from said "ON" position to said "OFF" position with said second operation member being prevented from moving from said second position to said first position by said restraining member when said restraining member is in said restraining position.

2. The operation switch device as defined in claim 1 wherein said resilient means is a spring mounted on said first operation member, and wherein said second operation member is formed by a part of said spring.

3. The operation switch device as defined in claim 1 wherein said spring is a torsion spring having a first end portion connected to said first operation member and having a second end portion formed as a free end which comprises said second operation member.

4. The operation switch device as defined in claim 3 wherein said first operation member includes an intermediate lever fixed thereto, wherein said torsion spring has a coiled portion coiled about said intermediate lever and has said first end portion connected to said intermediate lever, and wherein said intermediate lever has a stopper edge for preventing said second end portion from its restoring movement.

5. The operation switch device as defined in claim 1 wherein said second operation member is a rigid member pivotally mounted on said first operation member, and wherein said resilient means is a spring for normally holding said rigid member in a predetermined pivotal position relative to said first operation member.

6. The operation switch device as defined in claim 1 further including a casing for accommodating said switch and said second operation member therein, wherein said first operation member is pivotally movable relative to said casing, wherein said second operation member is pivotally movably mounted on said fist operation member by means of said resilient means, and wherein said restraining means is mounted on said casing and movable between said restraining position and said releasing position in a direction substantially parallel to the pivotal axis of said first operation member.

7. The operation switch device as defined in claim 6 wherein said restraining member is a push button, and wherein said second operation member is prevented from moving from said second position to said first position through abutment on said push button in said restraining position.

8. The operation switch device as defined in claim 7 wherein said push button includes a first abutting portion and a second abutting portion for abutment of said second operation member when said push button is in said restraining position and said releasing position, respectively, and wherein said push button further includes a partition wall formed between said first abutting portion and said second abutting portion, said partition wall serving to prevent said second operation member from transferring from said first abutting portion to said second abutting portion when said second operation member is in abutment on said first abutting portion, and said partition wall serving to prevent said second operation member from transferring from said second abutting portion to said first abutting portion.

9. The operation switch device as defined in claim 8 further including a spring for normally holding said push button in said restraining position.

* * * * *